J. C. WALKER.
Coffee Pot.
No. 67,932.
Patented Aug. 20, 1867.
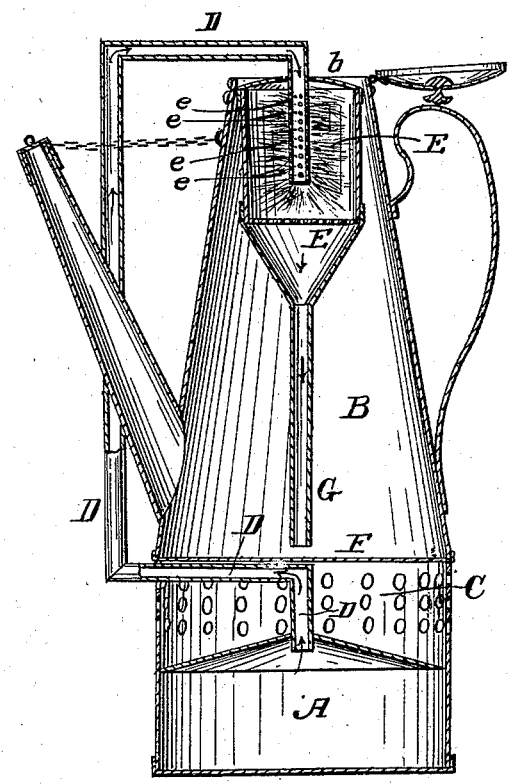
Witnesses:
Inventor:

United States Patent Office.

JAMES C. WALKER, OF WACO VILLAGE, TEXAS.

Letters Patent No. 67,932, dated August 20, 1867.

IMPROVEMENT IN COFFEE-POT.

*The Schedule referred to in these Letters Patent and making part of the same.*

TO ALL WHOM IT MAY CONCERN:

Be it known that I, JAMES C. WALKER, of Waco Village, in the county of McLennan, and State of Texas, have invented a new and improved Coffee-Pot; and I do hereby declare the following to be a full, clear, and exact description of the same, reference being had to the accompanying drawing, forming part of this specification, and in which the drawing represents a vertical elevation of my invention, the internal parts of the apparatus being shown as though the side of the coffee-pot next to the spectator were removed.

In this invention steam is introduced from a boiler, through a tube, into the centre of a vessel containing the coffee. The latter vessel is within the coffee-pot, and the essence of the coffee in it is extracted by the joint action of the steam and water within the coffee-pot.

In order that others skilled in the art to which my invention appertains may be enabled to make and use the same, I will proceed to describe it in detail.

In the drawings, A represents the boiler, which, for convenience, may be placed beneath the coffee-pot B, and connected with it by the perforated wall C, and having an aperture in its top for the admission of water, and a suitable cover to close it. The boiler is covered tight, and the steam generated within it is carried up by the pipe D running outside of the coffee-pot through the top of the coffee-pot, and thence through the cover $b$ down into a box or chest, E, in which the coffee is placed, where it is discharged through the perforations $e\,e\,e\,e$ into the centre of the mass of ground coffee. The chest or box E has a perforated bottom, E', beneath which is a pipe, G, running to within a short distance of the bottom F of the coffee-pot. At the point where the pipe G is attached to the bottom of the box E it is made funnel-shaped in order to embrace the large perforated surface E'. The chamber E is placed at such a point in the coffee-pot that when the pot is partially filled with water, the water will flow up into the tube G and reach the coffee above the perforated bottom E'.

The operation of my improved coffee-pot is as follows: I place a small quantity of cold water in the pot B. I then place the coffee in the chest or box E and insert it in the pot B, as shown in the drawing, connecting the box E, by the tube D, with the boiler A. The latter being caused to boil, its steam passes to the box E, and is discharged in the centre of the mass of coffee, thoroughly permeating every part of it and extracting its essence, and being at length condensed by the cold water which it meets near the bottom of the coffee-box E. The heat communicated by the steam will elevate the temperature of the cold water, but before it reaches the boiling point the process will have been completed and the contents of the pot be ready for use. It is evident that by placing the box E near the bottom of the pot B coffee can be made with a very small quantity of water, or with a larger quantity, as may be desired.

Having thus described my invention, what I claim as new, and desire to secure by Letters Patent, is—

The coffee-pot above described, consisting of the boiler A, tube D perforated at $e\,e\,e$, and box E, having the perforated bottom E', and tube G, all arranged and combined in connection with the pot B substantially as and for the purpose described.

To the above specification of my improvement I have signed my hand this 29th day of June, 1867.

JAS. C. WALKER.

Witnesses:
CHAS. A. PETTIT,
SOLON C. KEMON.